United States Patent
Hood

Patent Number: 5,346,407
Date of Patent: Sep. 13, 1994

[54] BATTERY CONNECTOR COVER

[75] Inventor: Brian M. Hood, Mount Clemens, Mich.

[73] Assignee: United Technologies Automotive, Inc., Dearborn, Mich.

[21] Appl. No.: 122,841

[22] Filed: Sep. 17, 1993

Related U.S. Application Data

[63] Continuation of Ser. No. 767,309, Sep. 27, 1991, abandoned.

[51] Int. Cl.⁵ .......................................... H01R 13/52
[52] U.S. Cl. ................................. 439/522; 439/202; 439/892
[58] Field of Search ............... 439/147, 519, 521, 522, 439/760, 761, 149, 202, 892; 174/138 F

[56] References Cited

U.S. PATENT DOCUMENTS

| | | | |
|---|---|---|---|
| D. 244,864 | 6/1977 | Brooks | D13/119 |
| D. 316,398 | 4/1991 | Hill | D13/120 |
| 2,145,135 | 1/1939 | Ryalls | 173/259 |
| 2,671,819 | 3/1954 | Field | 136/170 |
| 2,800,522 | 7/1957 | Coleman et al. | 136/135 |
| 3,014,977 | 12/1961 | Geiser | 439/521 X |
| 3,633,154 | 1/1972 | Glantz | 439/202 |
| 3,790,920 | 2/1974 | Wening | 439/522 |
| 3,829,823 | 8/1974 | Dumesnie | 439/522 |
| 4,562,125 | 12/1985 | Davis | 429/65 |
| 4,698,459 | 10/1987 | Drake | 439/522 |
| 4,775,331 | 10/1988 | Magdesyan et al. | 439/522 X |
| 4,778,408 | 10/1988 | Morrison | 439/522 |
| 4,920,018 | 4/1990 | Turner | 439/522 X |
| 4,952,168 | 8/1990 | Schieferly et al. | 439/467 |
| 4,952,171 | 8/1990 | Sugiyama | 439/522 |
| 5,021,305 | 6/1991 | Turner | 439/522 |

FOREIGN PATENT DOCUMENTS

| | | |
|---|---|---|
| 2501917 | 9/1982 | France . |
| 2353146 | 12/1987 | France . |
| 2184900 | 7/1987 | United Kingdom ............... 439/522 |

*Primary Examiner*—Gary F. Paumen
*Assistant Examiner*—Hien D. Vu
*Attorney, Agent, or Firm*—Ronald G. Cummings

[57] ABSTRACT

A battery terminal connector cover and method of assembly where the connector cover has a hinged top wall and a bottom wall forming an enclosure with a battery post receiving aperture in the bottom wall and an attachment assembly for force-fit securement of a connector to the bottom wall in alignment with the post receiving aperture.

26 Claims, 2 Drawing Sheets

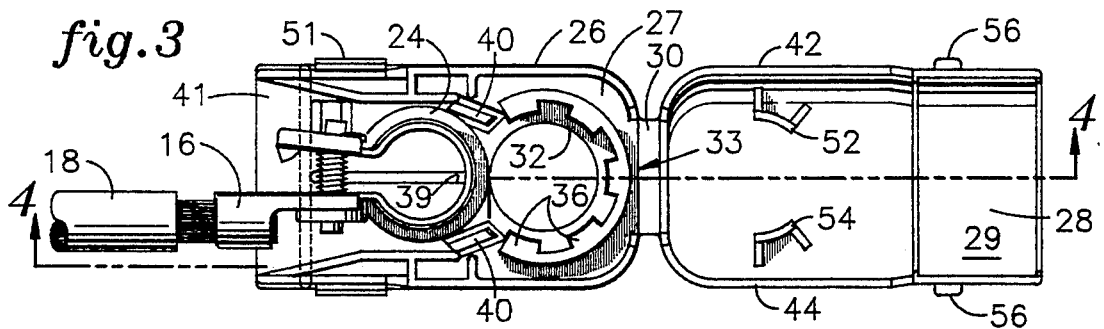
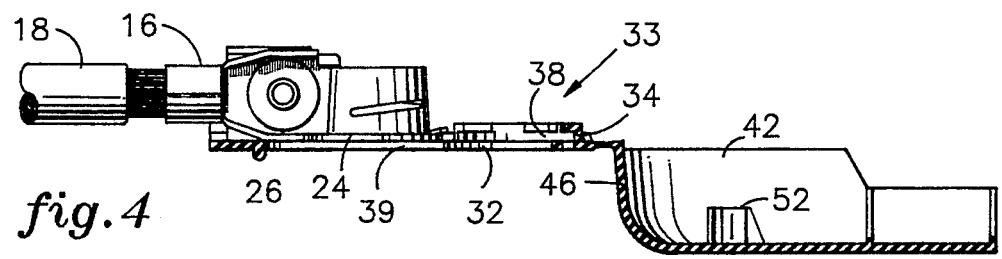
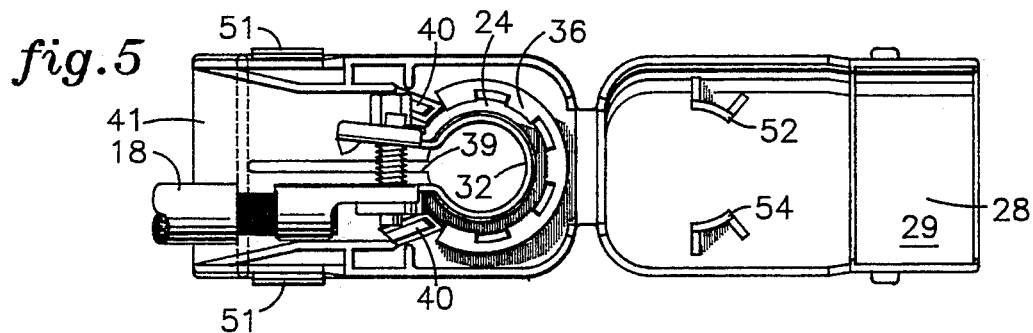
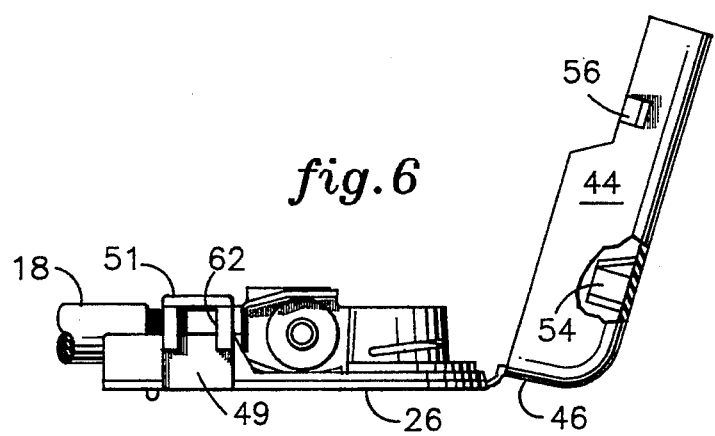

BATTERY CONNECTOR COVER

This application is a continuation of Ser. No. 07/767,309 filed Sep. 27, 1991, now abandoned.

TECHNICAL FIELD

This invention relates to terminal connectors for storage batteries and more particularly to a battery connector cover and method of installation having particular utility in motor vehicle assembly.

BACKGROUND AND SUMMARY OF THE INVENTION

Storage batteries of the type used in automobiles, trucks, tractors, other vehicles, etc. have a pair of terminal posts generally made of lead alloy material. The battery is interconnected to the vehicle electrical system by a battery cable assembly having connectors which clamp to the battery posts to provide an electrical and mechanical connection thereto.

Connector covers are utilized to enclose the connection of the connector to the battery post to protect against environmental factors such as corrosion, dirt, etc. and to electrically insulate the battery terminal connections.

It is desirable that a connector cover be economical to manufacture and install as well as easy and convenient to use in servicing the battery cable and/or battery. Prior connector covers did not lend themselves to automated installation on the battery cable assembly and thus were not economical to manufacture and install. Prior connector covers also tended to be inconvenient to use, overly complex in construction and/or somewhat ineffective in protecting the battery terminal connection.

It is a primary object of the present invention to provide a new and improved battery connector cover which accommodates automated installation onto the battery cable assembly.

Another object of the invention is to provide a connector cover which attaches directly to the connector to provide a unitary battery cable assembly for efficient shipping and inventory control prior to installation in a vehicle.

Another object of the invention is to provide such a connector cover which attaches to the connector by a push-on force-fit engagement therebetween.

A further object of the invention is to provide a connector cover which is convenient to use and which affords quick and easy access to the battery terminal connection.

A still further object of the invention is to provide a connector cover which is economical to manufacture, durable in use and aesthetically pleasing in appearance.

A still further object of the invention is to provide a new and improved method for installing a battery connector cover to a battery cable assembly.

Accordingly, it has been found that the foregoing and related objects are attained in a battery connector cover having a top wall and bottom wall configured to form an enclosure for the connector. The bottom wall has an aperture to receive a battery post therethrough and an attachment assembly for securing the connector to the bottom wall in alignment with the post aperture. The attachment assembly is configured for force-fit retention of the connector to the bottom wall of the cover. In a preferred embodiment, the bottom wall of the cover is molded plastic with the attachment assembly being a semi-circular segmented retention channel integrally formed with the bottom wall for force-fit retentive engagement with the annular mounting flange of a typical battery terminal connector. The mounting flange of the connector is insertable into the retention channel of the cover by substantially linear assembly motion so as to be particularly suited for automated assembly. The bottom wall has a slot extending outwardly from the post aperture to allow the bottom wall to momentarily flex and slightly enlarge the retention channel to facilitate insertion of the connector into the retention channel.

The top wall of the cover is connected to the bottom wall by a hinge connection to permit pivotal movement of the top wall between a closed position forming an enclosure for the connector and an open position permitting access to the connector. The top wall is configured to form opposing side walls and a front wall when the top wall is in the closed position. In a preferred embodiment, the top wall and bottom walls are integrally formed molded components connected by a living hinge.

BRIEF DESCRIPTION OF THE DRAWINGS

FIG. 3 is a plan view of the cover of the present invention in an open position with a connector being positioned just prior to securement to the cover.

FIG. 4 is a sectional view seen on line 4—4 of FIG. 3.

FIG. 5 is a plan view similarly to FIG. 3 with the connector secured to the cover.

FIG. 6 is a side view of the configuration of FIG. 5 with the top wall partially folded towards a closed position.

DESCRIPTION OF THE PREFERRED EMBODIMENT

Figure 1:
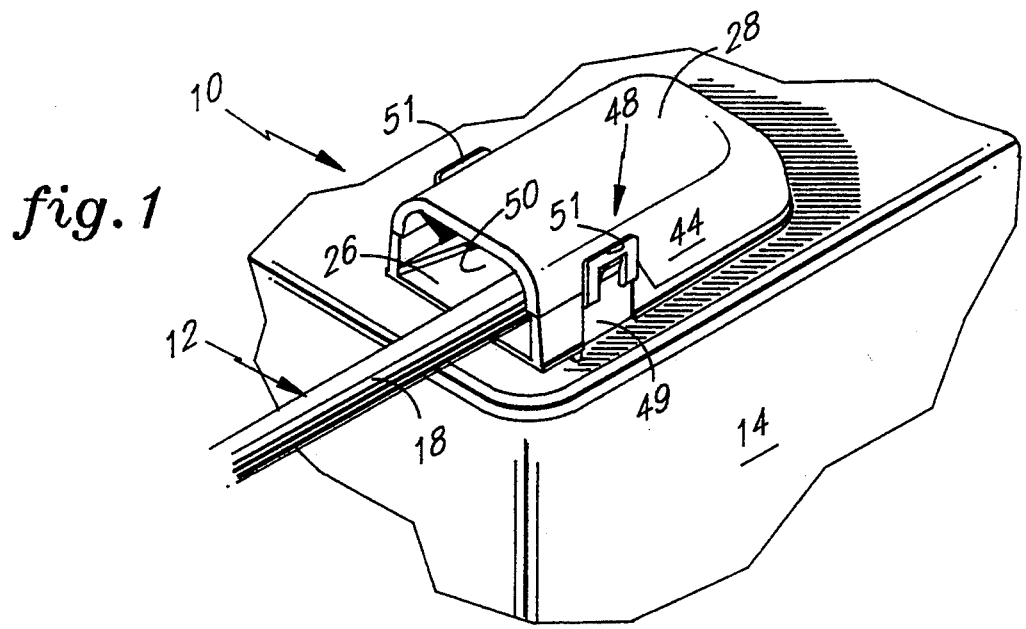
FIG. 1 is a partly broken away perspective view of the connector cover of the present invention attached to a battery cable assembly and mounted to a battery terminal post.
Figure 7:
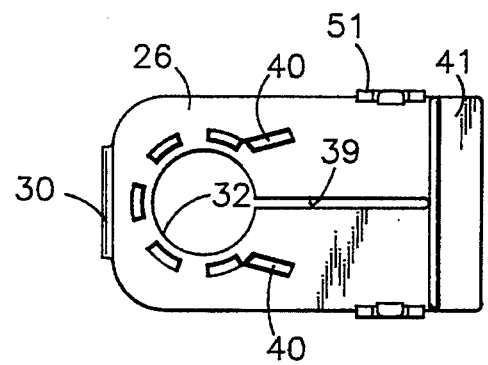
FIG. 7 is a bottom view of the cover in a closed position.

Although specific forms of the present invention have been selected for illustration in the drawings, and the following description is drawn in specific terms for the purpose of describing these forms of the invention, the description is not invented to limit the scope of the invention which is defined in the appended claims.

Referring to the drawings, the battery connector cover of the present invention is generally identified by the numeral 10 and is shown in FIG. 1 secured to a battery cable assembly 12 which is connected to the terminal post (not shown) of a conventional storage battery 14.

Figure 2:
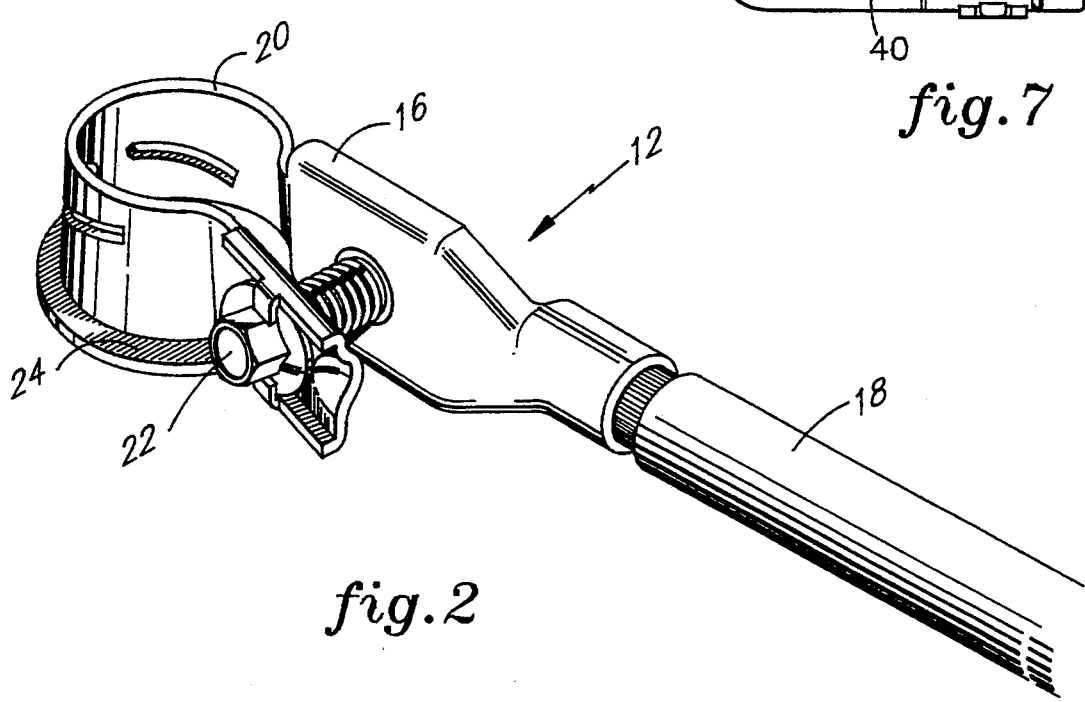
FIG. 2 is a partly broken away perspective view of a battery terminal connector.

Referring to FIG. 2, the battery cable assembly 12 comprises a terminal connector 16 secured by crimp connection to a battery cable 18. For purposes of describing the connector cover of the present invention, the connector 16 is considered to be generally of conventional design. The connector 16 is a stamped metal (brass) connector which has a cylindrical or frusta-conical split ring section 20 which receives the battery post. The ring section 20 is compressed about the battery post by rotating the bolt 22 to securely clamp the connector 16 to the battery post to form an electrical and mechanical connection thereto. The lower edge of the split ring section 20 has an annular mounting flange 24 which facilitates positioning the split ring section 20 over the battery post prior to tightening the bolt 22. It is the mechanical and electrical connection of the connector 16 to the battery post which is to be protected by the connector cover 10.

Referring to FIGS. 3 and 4, the connector cover generally comprises a bottom wall member 26 connected to a top wall 28 by a hinge section 30. In the illustrated embodiment, the wall members 26, 28 are integrally molded plastic components connected by a living hinge section 30 so as to form a one-piece mounting cover. The cover is preferably made of a relatively rigid thermoplastic material capable of withstanding the high temperature experienced in the engine compartment of automobile.

The bottom wall member 26 has an aperture 32 dimensioned to receive a battery post therethrough and a force-fit attachment assembly 33 for releasably securing the connector 16 to the bottom wall member 26 in alignment with the aperture 32. The attachment assembly 33 comprises a semi-circular boss section 34 concentrically disposed about the aperture 32 and a pair of stop tabs 40. The boss 34 has a plurality of radially inwardly extending spaced-apart tabs 36 generally parallel to the planar surface 27 of bottom wall 26. The tabs 36 and planar surface 27 form a segmented retention slot or channel 38 to receive the annular flange 24 of the connector 16. The retention channel 38 is dimensioned for force-fit retention of the annular flange 24 to securely attach the connector 16 to the bottom wall 26.

The semi-circular boss 34 which forms the segmented retention channel 38 opens rearwardly, i.e., to the left as viewed in FIG. 3, and encircles the aperture 32 greater than 180°. As depicted in FIG. 3, the connector 16 is secured to the bottom wall 26 by pushing the connector 16 forwardly until the annular flange 24 is force-fit into the retention channel 38. The flange 24 is inserted into the retention channel 38 by maintaining the flange 24 adjacent the planar surface 27 and pushing the connector 16 forwardly to force the annular flange 24 into the retention channel. As can be appreciated, the motion required for inserting the flange is substantially a linear pushing motion which is particularly compatible to automated assembly. While the illustrated embodiment utilizes a force-fit attachment assembly, it is to be understood that other types of securement means may be utilized, particularly fastenerless-type connections for snap lock engagement.

To facilitate insertion of the flange into the force-fit retention channel, a slot 39 in the bottom wall 26 extends rearward along the central axis of bottom wall 26 from the post aperture 32 to the rearward portion 41. The slot 39 is configured to permit the bottom wall 26 to flex slightly during forced insertion and momentarily enlarge the semi-circular shape of the boss 34 so as to require less insertion force while still attaining a secure retaining force once the flange 24 is mounted in the retention channel 38.

The stop tabs 40 are formed in bottom wall 26 and are positioned slightly to the rear of boss 34 at the terminal ends thereof. The stop tabs 40 extend upwardly from the surface 27 and forwardly, and are disposed to engage the rearward portion of annual flange 24 when it is secured by the spaced-apart tabs 36 as seen in FIG. 5. As can be appreciated, the stop tabs 40 do not significantly impede the forward movement of the connector 16 into the retention channel 38. However, once the connector is secured to the wall member 26, the stop tabs 40 function to inhibit withdrawal of the connector 16 therefrom.

As best seen in FIG. 5, the boss 34 is positioned and configured to align the opening of the ring section 20 of connector 16 with the post aperture 32 when the connector 16 is secured to the wall member 26. Alignment of the connector with the aperture 32 permits the easy mounting of the connector 16 to a battery post with the cover 10 assembled on the battery cable assembly 12.

The top wall 28 includes opposing side wall sections 42, 44 interconnected by a front wall section 46. The top wall member 28 is pivotal about the hinge member 30 between the open position as shown in FIGS. 1-3 and the closed position shown in FIG. 1. In the closed position as shown in FIG. 1, the top wall member 28 is secured to the bottom wall member 26 by snap-lock assemblies 48. In the closed position, the top wall member 28, including the side wall sections 42, 44 and front wall section 46, presents a continuous, rounded contour enclosure having an opening 50 at the rear end 41 for the battery cables 18 (only one of which is shown).

The top wall member 28 also has a pair of opposing stops or ribs 52, 54 which extend outwardly from the interior surface 29 of the top wall member 28. The ribs 52, 54 are slightly curved so as to generally correspond to the ring section 20 of connector 16 and are positioned relative to aperture 32 and boss 34 so as to abut the rearwardly disposed portion of ring section 20 when top wall member 28 is in the closed position. The height of ribs 52, 54 is greater than half the height of ring section 20 as shown in FIG. 4 so as to provide a substantial abutment stop to prevent a connector 16 from being withdrawn from the cover 10 when in a closed position. While it is believed that the retention force attained by the force-fit connection of flange 24 to retention channel 38 is sufficient to prevent unintended separation of the cover 10 from the battery cable assembly 12 during shipment or inventory storage prior to vehicle assembly, the stop ribs 52, 54 may be utilized to further ensure against such disconnection.

The snap lock assembly 48 comprises a pair of oppositely disposed snap-lock tabs 56 on the opposite side walls 42, 44 of top wall member 28. The tabs 56 are configured for snap-lock engagement with corresponding openings 62 formed by an upstanding projection 51 of rear sidewall sections 49 of bottom wall member 26. Upon folding the top wall member 28 into the closed position, the tabs 56 are forced through the opening 62 in snap-lock engagement therewith to secure the cover in a closed position. To release the snap-lock assembly 48, the opposing side walls 42, 44 are squeezed inwardly and the tabs 56 are released from the openings 62.

In assembling the battery cable assembly, the connector 16 is first crimped to the cable 18 in a conventional manner and the cover is then secured to the connector by an automated push-fit insertion of the connector flange into the attachment assembly with the top wall member 28 being in the open position. It is preferable that the cable assembly be transported to the vehicle manufacturer and inventoried with the cover open. The open cover position minimizes labor in vehicle assembly in that the step of opening the cover to secure the connector to the battery post is eliminated. It is believed that the retention strength of the attachment assembly is sufficient to allow the battery cables to be transported to the vehicle manufacturer in the open cover position without significant risk of disengagement of the cover from the connector. In the event substantial instances of disengagement are experienced, the cable assemblies may be transported with the covers in the closed position and the stop ribs 52, 54 will prevent disengagement.

In connecting the cable assembly to the battery post, the connector with cover attached is placed over the post so that the post extends upwardly through the cover aperture 32 and the ring section 20 of connector 16. The bolt 22 is then tightened to securely clamp the connector 16 to the post and the top wall 28 is folded to the closed position.

In the assembled position shown in FIG. 1, the cover encloses the battery post connection to protect the connection against deleterious environmental factors and to electrically insulate the connection from the consumer and serviceman. The bottom wall of the cover also insulates the connector from the battery body.

Access to the terminal connection for service of the battery or cable assembly is convenient and easy. The opposing side walls 42, 44 are squeezed slightly to disengage the snap lock assemblies 48 and the top wall 28 is folded to an open position. In the open position, full access to the bolt 22 is provided for loosening the ring section 20 to remove the cable assembly, etc.

As can be seen, a new and improved connector cover has been described which is particularly useful for automated assembly of the battery cable. The connector cover attaches directly to the connector by push-on force-fit engagement to provide a unitary battery cable assembly for efficient shipping, inventory control and vehicle installation. In use, quick, easy and convenient access to the terminal connection is provided. Accordingly, this device achieves all of its stated objectives.

As will be apparent to persons skilled in the art, various modifications and adaptations of the structure above described will become readily apparent without departure from the spirit and scope of the invention, the scope of which is defined in the appended claims.

I claim:

1. A battery connector cover for mounting to a terminal connector of the type adapted to clamp to a battery post comprising
    a top wall and bottom wall configured for forming an enclosure for a connector of the having a split ring section forming an opening for receiving a battery post and bolt means for compressing the split ring section about a battery post to clamp the connector to the battery post,
    said bottom wall having an aperture to receive a battery post therethrough, and the bottom wall having means extending therefrom for force-fit securing the connector to said bottom wall so that the opening of the connector is in alignment with said aperture.

2. The battery connector cover of claim 1 wherein said securing means is configured to permit substantially linear insertion of the connector into force-fit retentive engagement with said securing means.

3. The battery connector cover of claim 1 wherein said top wall is connected to said bottom wall by a hinge connection to permit pivotal movement of said top wall between a closed position forming an enclosure for the connector between said top and bottom walls and an open position permitting access to the connector.

4. The battery connector cover of claim 3 wherein said top wall forms opposing side walls and a front wall between said top and bottom walls when said top wall is in said closed position.

5. The battery connector cover of claim 3 wherein said top and bottom walls are integrally molded plastic connected by a living hinge section.

6. The battery connector cover of claim 3 wherein said top wall comprises retainer means for engaging the connector to prevent disengagement of the connector from said securing means when the top wall is in a closed position.

7. A battery connector cover for mounting to a terminal connector of the type adapted to clamp to a battery post and having an annular mounting flange, the battery connector cover comprising
    a top wall and bottom wall configured for forming an enclosure for a connector,
    said bottom wall having an aperture to receive a battery post therethrough,
    means for securing the connector to said bottom wall in alignment with said aperture,
    said bottom wall being molded plastic and said securing means comprising a semi-circular retention channel integrally formed with said bottom wall, said semi-circular retention channel being configured to receive the terminal connector laterally through an opening of the semi-circular retention channel for force-fit retention of an annular mounting flange of the connector.

8. The battery connector cover of claim 7 wherein said bottom wall comprises means for momentarily enlarging said retention channel to facilitate insertion of an annular mounting flange of the connector.

9. The battery connector cover of claim 7 wherein said bottom wall has a slot configured to permit momentary enlarging of said retention channel to facilitate insertion of an annular mounting flange of the connector.

10. The battery connector cover of claim 7 wherein said semi-circular retention channel is disposed about said aperture in said bottom wall and said bottom wall has a slot extending radially from said aperture so as to facilitate insertion of an annular mounting flange of the connector into said retention channel.

11. In combination,
    a battery connector for connecting a battery cable to a battery post comprising,
        a split ring section forming an opening for receiving a battery post and
        bolt means for compressing the split ring section about a battery post to clamp the connector to the battery post, and
    a battery connector cover comprising,
        a top wall and bottom wall configured to form an enclosure for said connector,
        said bottom wall having an aperture to receive a battery post therethrough, and
        the bottom wall having means extending therefrom for securing the connector to said bottom wall so that the opening of the connector is in alignment with said aperture.

12. The combination of claim 11 wherein said securing means comprises fastenerless connector means for securing the connector directly to said bottom wall.

13. The combination of claim 11 wherein said securing means comprises means for force-fit retention of the connector.

14. The combination of claim 3 wherein said securing means is configured to permit substantially linear insertion of the connector into force-fit retentive engagement with said securing means.

15. The combination of claim 11 wherein said top wall is connected to said bottom wall by a hinge connection to permit pivotal movement of said top wall between a closed position forming an enclosure for the connector between said top and bottom walls and an open position permitting access to the connector.

16. A battery connector cover for mounting to a terminal connector of the type adapted to clamp to a battery post comprising
 a top wall and bottom wall configured for forming an enclosure for a connector of the type having a split ring section forming an opening for receiving a battery post and bolt means for compressing the split ring section about a battery post to clamp the connector to the battery post,
 said bottom wall having an aperture to receive a battery post therethrough,
 means for force-fit securing the connector to said bottom wall so that the opening of the connector is in alignment with said aperture,
 said top wall comprising retainer means for engaging the connector to prevent disengagement of the connector from said securing means when the top wall is in a closed position,
 said retainer means comprising a pair of retaining stops configured and positioned to engage the connector so as to prevent disengagement of the connector from the securing means when the top wall is in a closed position, and
 said top wall being connected to said bottom wall by a hinge connection to permit pivotal movement of said top wall between a closed position forming an enclosure for the connector between said top and bottom walls and an open position permitting access to the connector.

17. The battery connector cover of claim 16 wherein said retaining stops are integrally formed with said top wall.

18. In combination,
 a battery connector for connecting a battery cable to a battery post comprising,
  a split ring section forming an opening for receiving battery post and
  bolt means for compressing the split ring section about a battery post to clamp the connector to the battery post, and
 a battery connector cover comprising,
  a top wall and bottom wall configured to form an enclosure for said connector,
  said bottom wall having an aperture to receive a battery post therethrough,
  means for securing the connector to said bottom wall so that the opening of the connector is in alignment with said aperture, and
  said bottom wall being molded plastic and said securing means comprises a semi-circular retention channel integrally formed with said bottom wall, said semi-circular retention channel being configured for force-fit retention of an annular mounting flange of the connector 19. The combination of claim 18 wherein said bottom wall comprises means for momentarily enlarging said retention channel to facilitate insertion of the annular mounting flange of the connector.

20. The combination of claim 18 wherein said bottom wall has a slot configured to permit momentary enlarging of said retention channel to facilitate insertion of the annular mounting flange of the connector.

21. The combination of claim 18 wherein said semi-circular retention channel is disposed about said aperture in said bottom wall and said bottom wall has a slot extending radially from said aperture so as to facilitate insertion of an annular mounting flange of the connector into said retention channel.

22. The combination of claim 21 wherein said top wall forms opposing side walls and a front wall between said top and bottom walls when said top wall is in said closed position.

23. The combination of claim 21 wherein said top and bottom walls are integrally molded plastic connected by a living hinge section.

24. The combination of claim 21 wherein said top wall comprises retainer means for engaging the connector to prevent disengagement of the connector from said securing means when the top wall is in a closed position.

25. The combination of claim 24 wherein said retainer means comprises a pair of retaining stops configured and positioned to engage the connector so as to prevent disengagement of the connector from the securing means when the top wall is in a closed position.

26. The combination of claim 25 wherein said retaining stops are integrally formed with said top wall.

* * * * *

UNITED STATES PATENT AND TRADEMARK OFFICE
CERTIFICATE OF CORRECTION

PATENT NO. : 5,346,407

DATED : September 13, 1994

INVENTOR(S) : Brian M. Hood

It is certified that error appears in the above-identified patent and that said Letters Patent is hereby corrected as shown below:

Column 5, line 46: "of the having" should read --of the type having--.

Column 6, line 27: "an" should read --the--.

Column 6, line 67: "claim 3" should read --claim 13--.

Signed and Sealed this

Twenty-first Day of February, 1995

Attest:

BRUCE LEHMAN

Attesting Officer     *Commissioner of Patents and Trademarks*